United States Patent
Bui et al.

(10) Patent No.: US 7,847,496 B2
(45) Date of Patent: Dec. 7, 2010

(54) DYNAMIC TAPE DRIVE CALIBRATION

(75) Inventors: Nhan Xuan Bui, Tucson, AZ (US);
Reed Alan Hancock, Tucson, AZ (US);
Wayne Isami Imaino, San Jose, CA (US); Haiyu Zhao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/032,420

(22) Filed: Feb. 15, 2008

(65) Prior Publication Data

US 2009/0206190 A1  Aug. 20, 2009

(51) Int. Cl.
*H02P 5/46* (2006.01)

(52) U.S. Cl. .............. 318/68; 318/6; 318/16; 318/266

(58) Field of Classification Search ............ 318/6, 318/16, 266, 466, 280, 283, 286, 68; 360/73.11
See application file for complete search history.

(56) References Cited

U.S. PATENT DOCUMENTS

| | | | |
|---|---|---|---|
| 4,157,488 A | 6/1979 | Allan | |
| 4,398,227 A | 8/1983 | Anderson | |
| 4,507,592 A | 3/1985 | Anderson | |
| 4,514,672 A | 4/1985 | O'Gwynn | |
| 6,760,176 B2 | 7/2004 | Koski | |
| 6,836,386 B2 * | 12/2004 | Koski | 360/73.11 |
| 2001/0043427 A1 | 11/2001 | Chen et al. | |
| 2002/0149872 A1 | 10/2002 | Koski | |
| 2004/0051991 A1 * | 3/2004 | Koski | 360/73.11 |
| 2004/0141250 A1 | 7/2004 | Harper et al. | |
| 2006/0126214 A1 | 6/2006 | Bui et al. | |
| 2006/0126215 A1 | 6/2006 | Bui et al. | |
| 2006/0245104 A1 | 11/2006 | Bui et al. | |

* cited by examiner

*Primary Examiner*—Paul Ip
(74) *Attorney, Agent, or Firm*—Konrad Raynes & Victor LLP

(57) ABSTRACT

Dynamic calibration of a secondary velocity signal is provided in a tape drive. In one example, a reel motor is operated to drive a reel carrying a tape in a tape drive. The motion of the tape is measured to provide a measured primary velocity signal of the tape, and in addition, the operation of the reel motor is measured to provide an estimated secondary velocity signal of the tape as a function of motor parameters and the motor operation measurements. The estimated secondary velocity signal of the tape may be calibrated as the tape is driven, as a function of the tape motion measurements and the motor operation measurements. Other embodiments are described and claimed.

25 Claims, 3 Drawing Sheets

DYNAMIC TAPE DRIVE CALIBRATION

FIELD

This description relates to tape drives, and, more particularly, to tape drives which employ motors, wherein the tape drive motors are arranged to longitudinally move a tape mounted on tape reels rotated by the motors under the control of a motor driver servo system.

BACKGROUND

Tape, such as magnetic tape, provides for physically storing data which may be archived or which may be stored in storage shelves of automated data storage libraries, and accessed when required. As an archival medium, tape often comprises the only copy of the data. In these and other situations, accuracy of the data and the prevention of damage to the tape can be a relatively high priority.

The servo system which moves the tape longitudinally is typically very precise, and the servo system bases the longitudinal movement on the instantaneous velocity of the tape. Tape drives frequently employ motors such as a DC motor, and a motor driver servo system for operating the DC motors, to produce well controlled motion parameters such as position, velocity, and tape tension. Precise control of tape velocity can facilitate correctly reading and/or writing data to the tape. For such control, a primary velocity signal is often generated, for example, employing a formatted servo track on the tape to directly measure the tape velocity. In the IBM LTO Ultrium Magnetic Tape Drive based on LTO (Linear Tape Open) technology, the servo track is made up of a sequence of repeated flux transitions, which produce a signal in a servo read head. The signal is a repeated set of bursts, that is peak detected to produce digital signals that can be used by logic to measure the time spacing between the bursts. The logic provides a count value of a reference oscillator to represent the time spacing of the bursts. This count value varies inversely with velocity, and is used to compute the velocity of the tape as it passes over the read head.

The primary velocity signal can be a very accurate, and direct, measurement of tape velocity. However, the primary velocity signal may not always be available for use in controlling the tape drive. During acceleration, deceleration, and while moving the read head between servo bands, the primary velocity signal typically is not available. There may also be exceptional conditions, such a loss of the servo signal, which make the primary velocity unavailable. Thus, it is useful if the tape drive is capable of controlling velocity without the aid of the primary velocity signal. During such times, an alternate, or secondary velocity signal may be utilized.

One example of a secondary velocity signal is derived from the back-EMF voltage in DC motors. As is known to those of skill in the art, the back-EMF voltage can be computed by subtracting the estimated winding resistance ohmic voltage from the motor voltage. The winding resistance ohmic voltage may be computed by multiplying the estimated motor current by the estimated winding resistance. The angular velocity of a DC motor may be estimated by dividing the back EMF voltage of the motor by the motor voltage constant of the motor. A servo system can estimate a longitudinal velocity $V_E$ of the tape by multiplying the calculated motor angular velocity $\omega_C$ by the radius R of the tape at the reel the motor is driving.

Other examples of secondary velocity derivations may include use of encoders or analog tachometers. For example, it may be possible to estimate a suitable secondary velocity from the outputs of Hall sensors, depending upon the output resolution. For example, a DC motor may have 72 Hall states per revolution.

In tape drives, appropriate control of the tension on the tape can reduce excessive strain on the tape and thus reduce tape failure. In addition, reduction of tension variations can also restrict lateral motion and reduce timing induced difficulties in the data channel. Tension sensors can facilitate reduction of excessive tape strain. However, due to cost concerns, tape drives may not incorporate a tension sensor.

Precise control of tape velocity can reduce excessive tape strain. The secondary velocity is typically always available, but usually does not have the accuracy of the primary velocity signal. For example, in the case of the back-EMF measurement, the velocity signal typically includes error sources, such as motor torque constant tolerances, winding resistance tolerances, thermal effects, motor driver signal tolerances, and motor current estimation tolerances, among others.

These and other motor parameters and operational signals may be controlled to a degree through the manufacturing process by measuring and controlling the motor variations from the manufacturer, and measuring and controlling the variations in the assembled drive. In addition, motor parameters may be calibrated for each particular tape drive.

For example, U.S. Pat. No. 6,838,386 describes a calibration technique in which logic operates each DC motor of the tape drive under separate control at a steady state computed or estimated angular velocity $\omega_C$ for at least one full revolution without driving tape. Thus, the motors may be operated when the tape cartridge is removed, for example.

Rotation index sensors may be used in this technique to indicate a full revolution of each of the DC motors such that the time duration of the full revolution of each of the DC motors may be measured. The actual angular velocity $\omega_A$ of each of the DC motors may be determined by dividing $2\pi$ by the measured time of the full revolution of each of the DC motors. A calibration constant may be calculated for each of the DC motors by comparing the computed estimated velocity $\omega_C$ during the full revolution, to the determined actual velocity $\omega_A$. When the tape drive is operated with a cartridge inserted into the tape drive, a longitudinal tape velocity for the tape may be estimated based upon the calibrated motor velocity of each motor.

SUMMARY

Dynamic calibration of a secondary velocity signal is provided in a tape drive. In one example, a reel motor is operated to drive a reel carrying a tape in a tape drive. The motion of the tape is measured to provide a measured primary velocity signal of said tape, and in addition, the operation of the reel motor is measured to provide an estimated secondary velocity signal of the tape as a function of motor parameters and the motor operation measurements. The estimated secondary velocity signal of the tape may be calibrated as the tape is driven, as a function of the tape motion measurements and the motor operation measurements.

In one embodiment, the secondary velocity signal may be calibrated by changing the motor parameters as a function of the tape motion measurements and the motor operation measurements. Such motor parameters may include, for example, the winding resistance of the reel motor and the torque constant of the reel motor.

In another aspect, the tape motion may be measured by sampling linear velocity signals of the tape in an interval of operation of the tape drive to provide a plurality of measured primary velocity signals of the tape. In addition, the operation of the motor may be measured by sampling motor operation signals of the reel motor in the interval to provide a plurality of estimated secondary velocity signals of the tape.

In another aspect, the motor parameters may be changed by minimizing the difference between each measured primary velocity signal and an associated estimated secondary velocity signal in the interval. In one embodiment, a sum which is a function of the tape linear velocity signals, the tape reel radius signals, the EMF signals and the drive current signals sampled in the interval may be minimized by applying a least squares computation. Other embodiments are described and claimed.

BRIEF DESCRIPTION OF THE DRAWINGS

For a fuller understanding of the present description, reference should be made to the following taken in conjunction with the accompanying drawings.

DETAILED DESCRIPTION

Embodiments are described with reference to the Figures, in which like numbers represent the same or similar elements. It will be appreciated by those skilled in the art that variations may be accomplished in view of these teachings without deviating from the spirit or scope of this description.

In the illustrated embodiment, the primary velocity signal is a very accurate, and direct, measurement of tape velocity. However, as noted above, the primary velocity signal may not always be available for use in controlling the tape drive. Thus, for example, during acceleration, deceleration, and while moving the read head between servo bands, the primary velocity signal may not be available. There may also be exceptional conditions, such a loss of the servo signal, which make the primary velocity unavailable.

As used herein, the term "secondary velocity" refers to an estimate of the tape velocity based on observed motor operational data and based on motor parameters. In one example, a secondary velocity signal may be computed based on estimating the back-EMF voltage in DC motors from the motor excitation data, and based on motor parameters, such as winding resistance, and motor torque constant. However, in accordance with one aspect of the present description, the secondary velocity signal may be frequently recalibrated while the drive is operational, that is, while driving a tape. In one embodiment, the primary velocity signal may be utilized to recalibrate the secondary velocity signal as the tape is driven.

Figure 1:
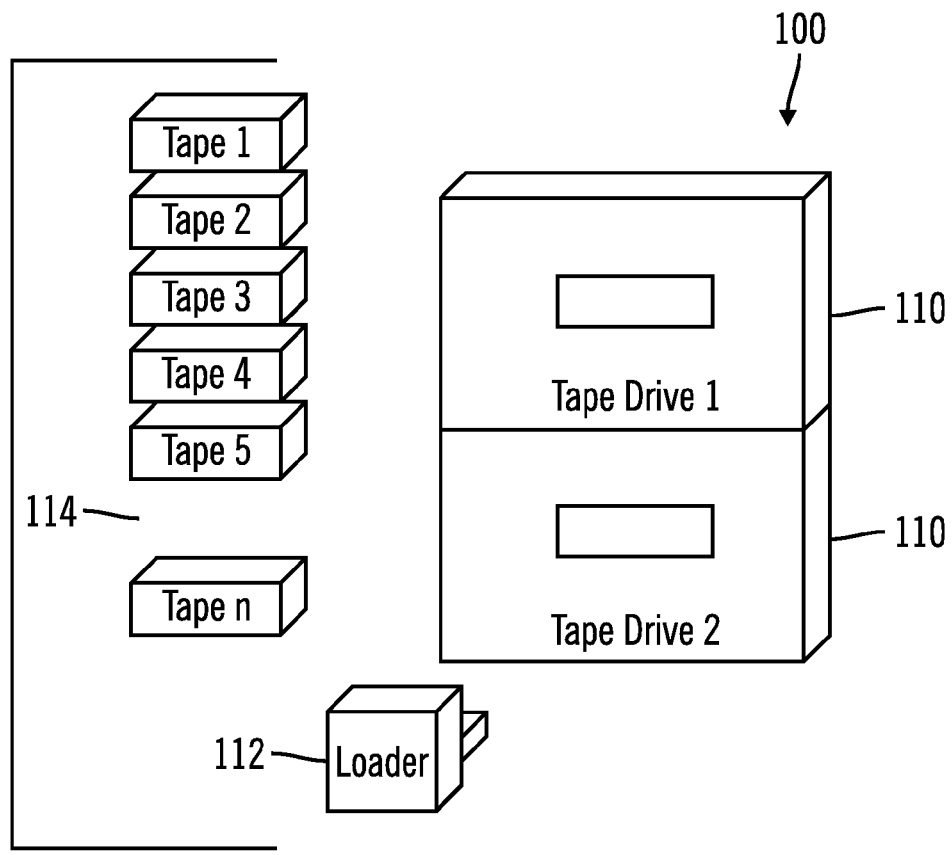
FIG. 1 illustrates one embodiment of a tape library system incorporating dynamic tape drive calibration in accordance with the present description.

FIG. 1 illustrates a tape library system 100 which includes at least one tape drive 110 which, in accordance with one aspect of the present description, has dynamic motor velocity calibration as discussed in greater detail below. The system 100 further includes a loader 112, and a library of tape cassettes or cartridges 114 that can be accessed by the loader 112 so as to load the tape drive 110 with an appropriately identified tape cassette or cartridge.

Figure 2:
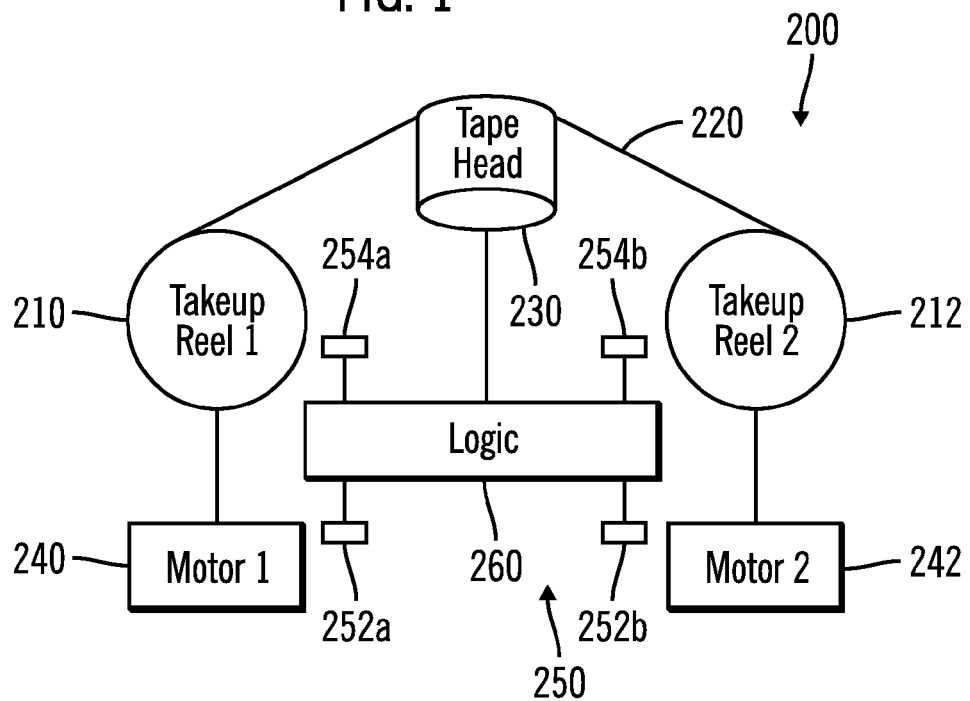
FIG. 2 illustrates one embodiment of a tape system incorporating dynamic tape drive calibration in accordance with the present description.

FIG. 2 illustrates a tape system 200 which, in accordance with one aspect of the present description, has dynamic motor velocity calibration as discussed in greater detail below. The tape system 200 includes first and second reels 210, 212. Magnetic recording tape 220 is spooled on the first and second reels 210, 212. The magnetic recording tape 220 is routed over a tape head 230 for reading and writing data on the magnetic recording tape 220. Reel motors 240, 242 control the positioning of the magnetic recording tape 220 over the tape head 230. The reel 210, 212 which is supplying tape at a particular time is often referred to as the "outboard" reel and the reel 210, 212 which is taking up the tape at a particular time is often referred to as the "inboard" reel. The reel motors 240, 242 are in turn controlled by a control system 250 which includes one or more motor operation sensors 252a, 252b and one or more tape radius sensors 254a, 254b which sense the radius R of the tape 220 at the reel 210, 212 the motor 240, 242 is driving. The motor operation sensors 252a, 252b can include electromotive force (EMF) sensors, for example.

As discussed above, the servo system which moves the tape longitudinally is typically very precise, and the servo system bases the longitudinal movement on the instantaneous velocity of the tape. In addition, a calibration routine may be run while there is no tape in the drive. However, it is recognized that, for very long operations on a single tape cartridge, tension control may not be optimal since the motor parameters may have changed due to changes in operating conditions such as temperature variations.

In accordance with one aspect of the present description, the control system 250 includes logic 260 adapted to sample linear velocity signals of the tape 220 in an interval of operation of the tape drive in which the tape 220 is being driven, sample motor operation signals of the reel motor 240, 242 in that interval, and calibrate an estimated secondary velocity signal of the tape as a function of the tape linear velocity signals and the motor operation signals sampled in the interval. The control system 250 can generate motor velocity command signals as a function of the calculated secondary velocity signals, to further operate the reel motors 240, 242 to further drive the reels 210, 212 and the tape 220. The secondary velocity signals may be recalibrated in succeeding intervals as the tape continues to be driven.

As a consequence, it is believed that the tape velocity may be more accurately controlled, even when the primary velocity signal is unavailable. As a result, it is believed that the tension may be more accurately controlled and any resultant damage to the tape may be reduced or eliminated. It is appreciated that other features may be realized in a system in accordance with the present description, depending upon the particular application.

Figure 3:
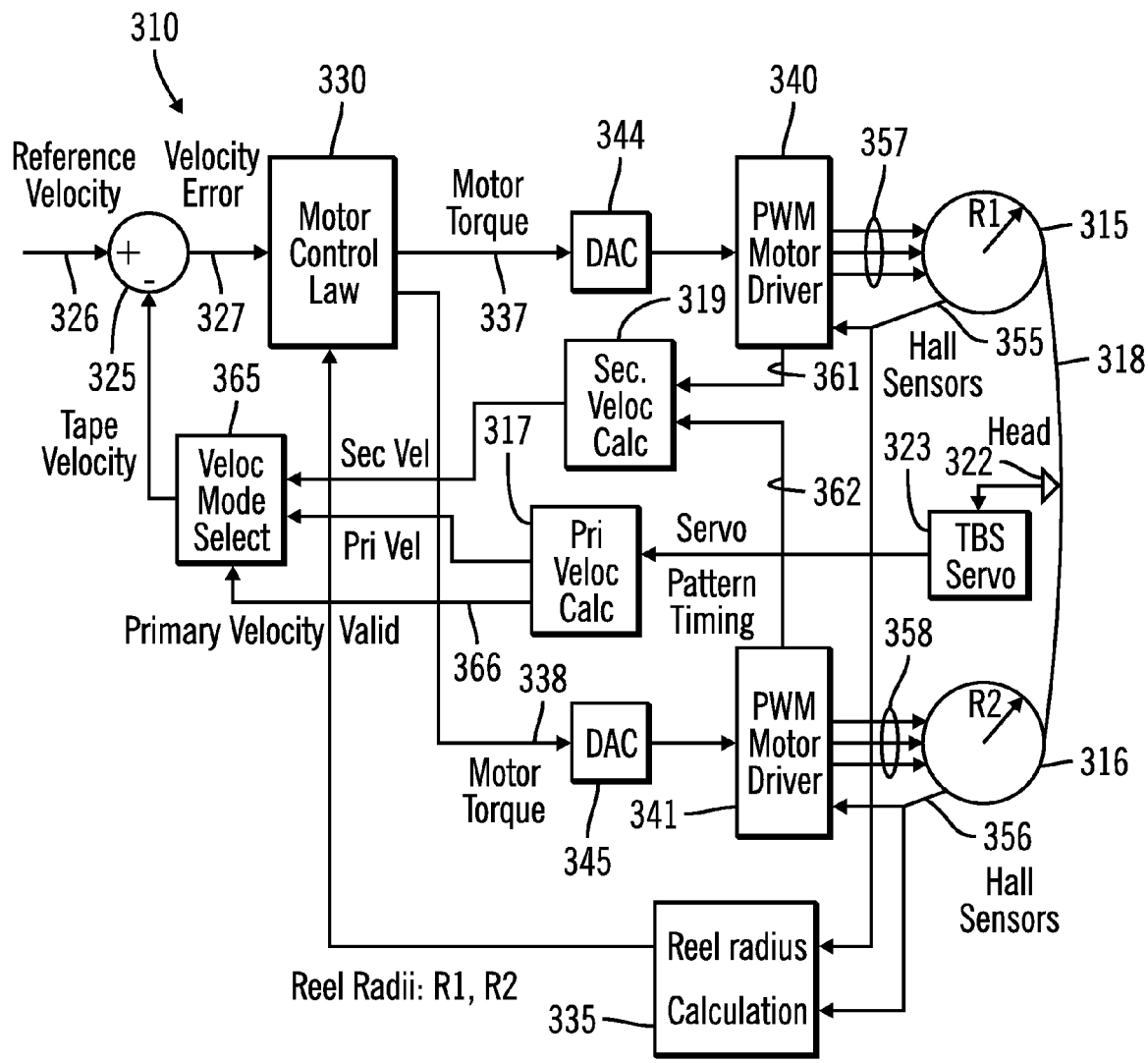
FIG. 3 is a block diagrammatic illustration of one embodiment of a tape drive incorporating dynamic tape drive calibration in accordance with the present description.

A more detailed example of a tape drive 310 in accordance with the present description is illustrated in FIG. 3, and comprises a dual servo system for moving the tape longitudinally between reels driven by brushless DC motors 315 and 316. In the example of FIG. 3, a primary velocity signal is generated by logic 317 employing a formatted servo track on the tape 318 to directly measure the tape velocity, and a secondary velocity signal is derived by logic 319 from signals relating to the back-EMF of the DC motors 315 and 316.

An example of a directly sensed servo velocity is provided by the IBM 3580 Ultrium magnetic tape drive based on LTO (Linear Tape Open) technology, where the servo track on the tape is made up of a sequence of repeated flux transitions, which produce a signal in a servo read head 322. The signal is a repeated set of bursts, that is peak detected to produce digital signals that can be used by logic 323 to measure the time spacing between the bursts. The logic provides a count value of a reference oscillator to represent the time spacing of the bursts. This count value varies inversely with velocity, and is used by logic 317 to compute the velocity of the tape as it passes over the read head.

The tape velocity is compared by a comparator 325 to a reference tape velocity 326 to determine a velocity error 327. The velocity error is employed in logic 330, together with reel radii calculations from logic 335 to generate a motor torque signal 337, 338 for each DC motor. In this manner, the tape velocity may be calculated based on known parameters of the servo pattern, and adjusting the motor currents as appropriate.

The tape reels are driven by DC motors 315, 316, for example, comprising brushless DC motors. The DC motors are driven by pulse width modulation (PWM) motor drivers 340, 341 with current-mode or transconductance amplifiers, as is known to those of skill in the art. The amplifiers have current sense circuits which produce a motor current signal that is subtracted from a reference current supplied by a DAC (digital to analog converter) 344, 345. The difference between the current reference and the current sense produces an error current signal that is amplified and filtered in a compensator circuit that produces a motor control signal. This signal drives a pulse width modulator (PWM) which produces a digital signal that continually reverses the polarity of the voltage that is applied to the DC motor. The PWM signal is fed to a commutator circuit which is also controlled by commutation sensors (Hall sensors) 355, 356 that sense the motor armature position and select the proper motor winding that is to be excited by means of winding excitation lines 357, 358. The present technique is also applicable to brushed DC motors, for example.

The servo and control system of the illustrated embodiment is a multiple input, multiple output (MIMO) system that computes two control values for the plant, which is made up of the two motors 315, 316, two tape reels, and the tape path connecting the two reels. The reels may be rotated at the appropriate, usually different, rotational velocities, as determined by the reel radius calculation 335, such that the tape is moved from one tape reel having one diameter of tape, to another tape reel having another diameter of tape, at the same longitudinal velocity. It is appreciated that a variety of techniques may be utilized for determining the lengths of tape (or the pack radius) on the respective reels.

The MIMO control system computes the control values, in this case the appropriate motor currents, to achieve a tape motion which is within suitable tape motion parameters. The computed motor currents are converted to analog voltages in digital to analog converters (DACs) which drive the current mode amplifiers.

Motor operation signals are provided on lines 361, 362 to the secondary velocity calculation logic 319, and the information is employed with motor parameters to determine the secondary velocity. Velocity mode selection logic 365 selects the primary velocity 317 when it is available, for example, as indicated by line 366, and selects the estimated secondary velocity 319 when the primary velocity is not available.

The above description provides one example of a suitable tape drive which may employ dynamic tape drive calibration in accordance with the present description. It is appreciated that other types of tape drives may be suitable as well.

The secondary velocity signal can include error sources, such as motor voltage constant tolerances, winding resistance tolerances, thermal effects, motor driver signal tolerances, and motor current estimation tolerances, among others. In accordance with the present description, the secondary velocity signal is dynamically calibrated and recalibrated as the tape is driven, to improve the accuracy of the secondary velocity signal.

For example, $\omega_i$, the angular velocity of the inboard reel, is a function of the actual tape velocity, that is, the primary velocity $V_{si}$ as measured by the servo system as follows:

$$\omega_i = V_{si}/R_i$$

where:
$R_i$=tape radius at the inboard reel.

The angular velocity $\omega_i$ of the inboard reel is also related to back-EMF of the DC motor that is driving the inboard reel as follows:

$$\omega_i = V_{bi}/k$$

where:
$V_{bi}$=motor back-EMF of the motor for the inboard reel,
k=torque constant of the motor for the inboard reel.

The applied motor voltage $EMF_i$ is related to the back-EMF $V_{bi}$ for the inboard reel as follows:

$$EMF_i = V_{bi} + (i_i * r)$$

where:
$i_i$=the command current to the motor of the inboard reel,
r=the winding resistance of the motor of the inboard reel.

Thus, the applied motor voltage $EMF_i$ is related to the winding resistance and the torque constant of the motor for the inboard reel as follows:

$$EMF_i = (k*\omega_i) + (i_i*r) = (k*(V_{si}/R_i)) + (i_i*r)$$

In accordance with the present description, the drive can measure the applied motor voltage $EMF_i$ at the input of the reel motor windings, over a set of individual measurements of the applied motor voltage $EMF_i$ while the motor is being operated to drive the tape over an interval of time. For each measurement of the applied motor voltage $EMF_i$ over the interval, the motor current $i_i$ is known since it is computed by the MIMO control system. In addition, the actual tape speed, as represented by the primary velocity signal $V_{si}$, may be measured by the servo system over the same interval. Still further, the tape radius $R_i$ at the inboard reel may be measured. Using these measurements of $EMF_i$, $i_i$, $R_i$, and $V_{si}$ over the course of operation of the drive, the winding resistance r and the torque constant k may be determined dynamically as operating conditions change.

For greater accuracy in determining the coil resistance and torque constant of the motor, it is believed that the input variables, $EMF_i$, $i_i$, $R_i$, and $V_{si}$ may span a minimum specified range. This is may be accomplished in one embodiment by sampling the variables over a complete acceleration, cruise, and deceleration cycle. The drive records these variables in arrays and computes the coil resistance and torque parameters through minimizing the sum of errors:

$$\Pi = \sum_{i=1}^{n} (KV_{si} - R_i EMF_i + R_i i_i r)^2 = min$$

so as to minimize the difference between the measured actual tape velocity, that is, the primary tape velocity $V_{si}$ (as measured by the servo system), and the estimated tape velocity, or secondary tape velocity ($\omega_i * R_i$) where the reel angular velocity $\omega_i$ is estimated based upon sensed motor operation data and calculated motor parameters.

In one example, the condition for minimizing the sum of errors using a least squares method results in the following expressions for the winding resistance r and the torque constant k:

$$k = \frac{\sum_{i=1}^{n} V_{si} R_i EMF_i \sum_{i=1}^{n} R_i^2 i_i^2 - \sum_{i=1}^{n} R_i i_i V_{si} \sum_{i=1}^{n} R_i^2 EMF_i i_i}{\sum_{i=1}^{n} V_{si}^2 \sum_{i=1}^{n} R_i^2 i_i^2 - \left(\sum_{i=1}^{n} R_i i_i V_{si}\right)^2}$$

$$r = \frac{\sum_{i=1}^{n} V_{si}^2 \sum_{i=1}^{n} R_i^2 EMF_i i_i - \sum_{i=1}^{n} V_{si} R_i EMF_i \sum_{i=1}^{n} R_i i_i V_{si}}{\sum_{i=1}^{n} V_{si}^2 R_i^2 i_i^2 - \left(\sum_{i=1}^{n} R_i i_i V_{si}\right)}$$

where n=the number of samples collected, such as n=100, for example.

The above equations may be implemented in the microcode of the tape drive to repeatedly calculate and update the calculated values for the winding resistance r and the torque constant k for the motor of the inboard reel as the tape drive drives the tape. Hence, if the motor operating conditions change as the tape is driven, the values calculated for the winding resistance r and the torque constant k for the motor of the inboard reel can change as well as the tape drive drives the tape. In this manner, it is believed that changes in velocity which might be caused by the tape drive switching back and forth between the primary velocity and the secondary velocity signals, may be reduced. The winding resistance r and the torque constant k for the motor of the outboard reel may be dynamically calculated in a similar manner using the same or similar equations discussed above, as the tape drive drives the tape. Thus, by comparing the velocities as derived from the servo pattern and the velocity as derived from the sensed motor speed, the motor parameters may be extracted by enforcing self consistency.

Thus, the servo system 250 can generate motor velocity command signals as a function of the actual tape linear velocity as represented by the primary velocity signal $V_s$. Alternatively, should the primary velocity signal not be available, the servo system 250 can generate motor velocity command signals as a function of the secondary velocity signal, or estimated tape linear velocity which are dynamically calibrated and recalibrated as the tape is driven by frequently updating the motor parameters. It is believed that the motor parameters can be determined with increased accuracy when calculated over an interval of operation of driving the tape. As a result, it is believed that changes in tape velocity as the servo system switches between the primary and secondary velocities may be reduced, and the bulk tension settings may be more accurately determined to reduce tape damage. It is appreciated that other features may be realized in a tape drive in accordance with the present description.

Figure 4:
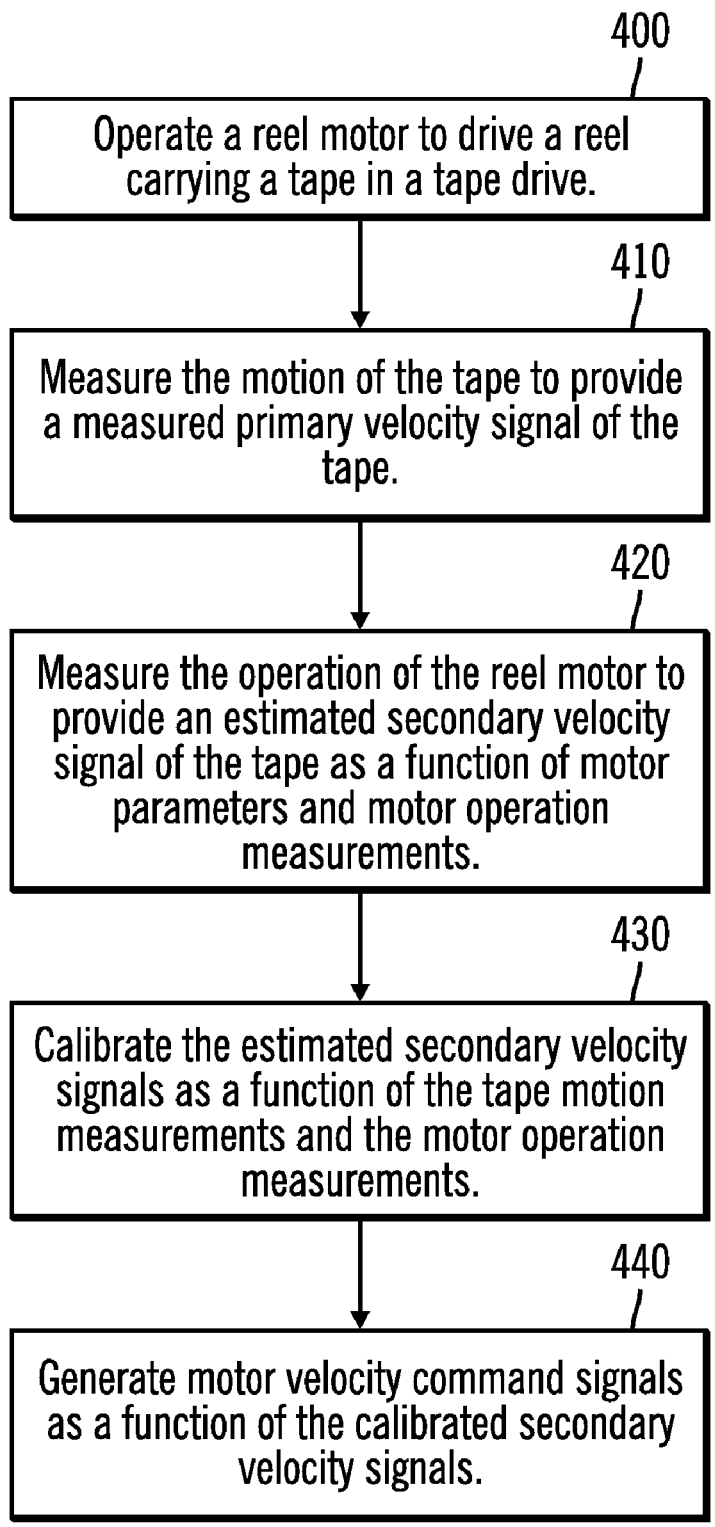
FIG. 4 is a flowchart illustrating one embodiment of operations of a tape drive incorporating dynamic tape drive calibration in accordance with the present description.

FIG. 4 shows one example of operations of a tape drive in accordance with the present description, in which secondary velocity signals may be dynamically calibrated as the tape drive is operated to drive a tape. Thus, in a first operation, a reel motor is operated (block 400) to drive a reel carrying a tape in a tape drive. As the tape is driven, the motion of the tape may be measured (block 410).

In the illustrated embodiment, linear velocity signals of the tape may be sampled over an interval of operation of the tape drive to measure the motion of the tape, to provide a plurality of measured primary velocity signals of the tape. For example, sampling of tape linear velocity signals may include using a servo head to sense servo signals recorded on the tape as described above. The sampled servo signals can provide an indication of the actual linear velocity of the tape. It is appreciated that the actual linear velocity of the tape may be determined by other sensors, depending upon the particular application.

In another operation, the operation of the reel motor may be measured (block 420) as the tape is driven, to provide an estimated secondary velocity signal for the tape as a function of motor parameters and the motor operation measurements. For example, motor operation signals of the reel motor may be sampled in the same interval as the linear velocity signals to provide a plurality of estimated secondary velocity signals of the tape in the same interval. In the illustrated embodiment, the motor operation signals sampled may include an electromotive force (EMF) signal associated with the operation of the reel motor and a drive current signal associated with the operation of the reel motor.

For example, as described above, the tape drive can measure the applied motor voltage $EMF_i$ at the input of the reel motor windings of the inboard motor, over a set of individual measurements of the applied motor voltage $EMF_i$ while the inboard motor is being operated to drive the tape over the particular interval of time. In addition, for each measurement of the applied motor voltage $EMF_i$ over the interval, the motor current $i_i$ input into the windings is known since it can be computed by the MIMO control system. The sampling of motor operation signals may further include sampling tape reel radius signals of the reel of the tape being driven by the reel motor in the interval. It is appreciated that the particular motor operational signals which are sampled while the tape is being driven, may vary, depending upon the particular application.

In the illustrated embodiment, the motor operation signals are sampled at least once every 400-1600 microseconds in the interval. Thus, the motor operation signals may be sampled every 800 microseconds, for example. It is appreciated that the rate at which motor operation signals are sampled may vary, depending upon the particular application.

Also, in the illustrated embodiment, the duration of the interval over which the motor operation signals are sampled may be sufficiently long to permit, for example, 10-1000 samples of the motor operation signals to be collected in the interval. Thus, 100 samples of the motor operation signals may be collected for example, in a single sampling interval. It is appreciated that the number of samples of motor operation signals taken in a sampling interval may vary, depending upon the particular application.

Still further, in the illustrated embodiment, the interval may include a complete cycle of tape motions including acceleration, cruise and deceleration of the tape. It is appreciated that the motions of the tape which are driven during any one particular sampling interval, may vary, depending upon the particular application.

Once an appropriate number of samples has been taken, the estimated secondary velocity signal may be calibrated (block 430) as a function of the tape motion measurements and the motor operation measurements. In the illustrated embodiment, the estimated secondary velocity signal may be calibrated by changing the values of motor parameters as appropriate as the tape is driven by the reel motor.

In one example, motor parameters may be changed to minimize differences between each measured primary velocity signal and an associated estimated secondary velocity signal in the interval. Thus, motor parameters may be calculated as a function of the tape linear velocity signals and the motor operation signals sampled in the interval. As additional samples are taken, the calculated motor parameters can change from interval to interval.

In the illustrated embodiment, the calculated motor parameters may include the winding resistance of the reel motor and the torque constant of the reel motor. As set forth above, these parameters may be calculated and recalculated by applying a least squares computation to minimize a sum which is a function of the tape linear velocity signals, the tape reel radius signals, the EMF signals and the drive current signals sampled in each interval. It is appreciated that other motor parameters may be calibrated based on other tape and motor operation signals sampled while the tape is operated.

Having calibrated the estimated secondary velocity signals of the tape as the tape is driven, the reel motor may be further operated to continue to drive the tape by generating (block 440) motor velocity command signals as a function of the calibrated estimated secondary velocity signals of the tape. Thus, should the primary velocity signal be unavailable, it is believed that the tape may be driven with increased accuracy using the secondary velocity signals which can be continuously calibrated and recalibrated as the tape is driven.

Thus, disclosed is a method for using an iterative learning controller for calibrating motor parameters during normal operation of the tape drive and updating the parameters as appropriate. It is believed that tension control during operation may be improved.

Figure 5:
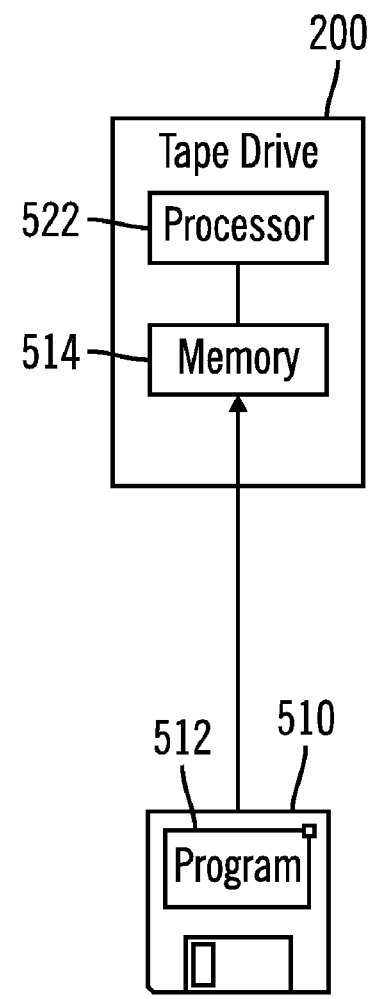
FIG. 5 is a schematic diagram illustrating one embodiment of deploying instructions for dynamic tape drive calibration in accordance with the present description.

The operations discussed above may be tangibly embodied in a computer-readable medium or carrier, e.g. one or more of the fixed and/or removable data storage devices 510 illustrated in FIG. 5, or other data storage or data communications devices. A computer program 512 on the storage device 510 may be loaded into the memory 514 or into the storage device 510 to configure logic for execution. The computer program 512 comprise instructions which, when read and executed by a processor 522 of the tape drive 200, as illustrated in FIG. 2, causes the tape drive 200, as illustrated in FIG. 2, to perform the operations described.

While the various embodiments have been illustrated in detail, it should be apparent that modifications and adaptations to those embodiments may occur to one skilled in the art without departing from the scope of the present description as set forth in the following claims.

What is claimed is:

1. A method, comprising:
   operating a reel motor to drive a reel carrying a tape in a tape drive;
   measuring the motion of the tape to provide a measured primary velocity signal of said tape;
   measuring the operation of the reel motor to provide an estimated secondary velocity signal of said tape as a function of motor parameters and the motor operation measurements; and
   calibrating the estimated secondary velocity signal of the tape as a function of said tape motion measurements and said motor operation measurements.

2. The method of claim 1 wherein said calibrating includes changing said motor parameters as a function of said tape motion measurements and said motor operation measurements.

3. The method of claim 2 wherein said motor parameters include the winding resistance of the reel motor and the torque constant of the reel motor.

4. The method of claim 2 wherein said operating a reel motor includes generating motor velocity command signals as a function of said calibrated estimated secondary velocity signal of the tape, to further operate said reel motor to further drive said reel and said tape.

5. The method of claim 1 wherein:
   said tape motion measuring includes sampling linear velocity signals of said tape in an interval of operation of said tape drive to provide a plurality of measured primary velocity signals of said tape;
   said motor operation measuring includes sampling motor operation signals of said reel motor in said interval to provide a plurality of estimated secondary velocity signals of said tape;
   said estimated secondary velocity signal calibrating includes changing motor parameters as a function of said tape linear velocity signals and said motor operation signals sampled in said interval; and
   said reel motor operating includes generating motor velocity command signals as a function of said changed motor parameters, to further operate said reel motor to further drive said reel and said tape.

6. The method of claim 5 wherein said sampling tape linear velocity signals includes sensing servo signals recorded on said tape.

7. The method of claim 6 wherein said sampling motor operation signals includes sampling electromotive force (EMF) signals associated with said operation of said reel motor and sampling drive current signals associated with said operation of said reel motor.

8. The method of claim 7 said sampling motor operation signals further includes sampling tape reel radius signals of said reel of said tape being driven by said reel motor in said interval.

9. The method of claim 5 wherein said motor parameter changing includes minimizing the difference between measured each primary velocity signal and an associated estimated secondary velocity signal in said interval.

10. The method of claim 8 wherein said motor parameters include the winding resistance of the reel motor and the torque constant of the reel motor, and wherein the EMF signal sampled is the voltage measured at the input of the windings of said reel motor and the drive current signal sampled is the current input into the windings of said reel motor.

11. The method of claim 10 wherein said motor parameter changing includes minimizing a sum which is a function of said tape linear velocity signals, said tape reel radius signals, said EMF signals and said drive current signals sampled in said interval.

12. The method of claim 11 wherein said minimizing the sum includes applying a least squares computation.

13. The method of claim 8 wherein said interval includes a complete cycle of acceleration, cruise and deceleration of said tape.

14. The method of claim 5 wherein said motor operation signals are sampled at least once every 400-1600 microseconds in said interval.

15. The method of claim 14 wherein 10-1000 samples of said motor operation signals are collected in said interval.

16. A tape drive system for a tape carried on a reel, comprising:
   a reel motor to drive a reel carrying a tape in the tape drive; and
   a controller adapted to operate said reel motor, said operating including measuring the motion of the tape to provide a measured primary velocity signal of said tape, measuring the operation of the reel motor to provide an estimated secondary velocity signal of said tape as a function of motor parameters and the motor operation measurements, and calibrating the estimated secondary velocity signal of the tape as a function of said tape motion measurements and said motor operation measurements.

17. The system of claim 16 wherein said calibrating includes changing said motor parameters as a function of said tape motion measurements and said motor operation measurements.

18. The system of claim 17 wherein said motor parameters include the winding resistance of the reel motor and the torque constant of the reel motor.

19. The system of claim 17 wherein said operating a reel motor includes generating motor velocity command signals as a function of said calibrated estimated secondary velocity signal of the tape, to further operate said reel motor to further drive said reel and said tape.

20. The system of claim 16 wherein:
said tape motion measuring includes sampling linear velocity signals of said tape in an interval of operation of said tape drive to provide a plurality of measured primary velocity signals of said tape;
said motor operation measuring includes sampling motor operation signals of said reel motor in said interval to provide a plurality of estimated secondary velocity signals of said tape;
said estimated secondary velocity signal calibrating includes changing motor parameters as a function of said tape linear velocity signals and said motor operation signals sampled in said interval; and
said reel motor operating includes generating motor velocity command signals as a function of said changed motor parameters, to further operate said reel motor to further drive said reel and said tape.

21. The system of claim 20 wherein said sampling tape linear velocity signals includes sensing servo signals recorded on said tape.

22. The system of claim 21 wherein said sampling motor operation signals includes sampling electromotive force (EMF) signals associated with said operation of said reel motor and sampling drive current signals associated with said operation of said reel motor.

23. The system of claim 22 said sampling motor operation signals further includes sampling tape reel radius signals of said reel of said tape being driven by said reel motor in said interval.

24. The system of claim 23 wherein said motor parameters include the winding resistance of the reel motor and the torque constant of the reel motor, and wherein the EMF signal sampled is the voltage measured at the input of the windings of said reel motor and the drive current signal sampled is the current input into the windings of said reel motor; wherein said motor parameter changing includes minimizing a sum which is a function of said tape linear velocity signals, said tape reel radius signals, said EMF signals and said drive current signals sampled in said interval; and wherein said minimizing the sum includes applying a least squares computation.

25. The system of claim 23 wherein said interval includes a complete cycle of acceleration, cruise and deceleration of said tape; wherein said motor operation signals are sampled at least once every 400-1600 microseconds in said interval; and wherein 10-1000 samples of said motor operation signals are collected in said interval.

* * * * *